(12) United States Patent
Yasuda et al.

(10) Patent No.: US 12,062,468 B2
(45) Date of Patent: Aug. 13, 2024

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Suguru Yasuda, Mie (JP); Motohiro Yokoi, Mie (JP); Kenta Ito, Mie (JP); Hiroki Hirai, Mie (JP); Makoto Higashikozono, Mie (JP); Koichiro Goto, Mie (JP); Junichi Shirakawa, Mie (JP); Yoshitaka Kami, Osaka (JP); Yasushi Nomura, Osaka (JP); Sofia Barillaro, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 331 days.

(21) Appl. No.: 17/441,543

(22) PCT Filed: Mar. 29, 2019

(86) PCT No.: PCT/JP2019/014123
§ 371 (c)(1),
(2) Date: Sep. 21, 2021

(87) PCT Pub. No.: WO2020/202291
PCT Pub. Date: Oct. 8, 2020

(65) Prior Publication Data
US 2022/0181044 A1 Jun. 9, 2022

(51) Int. Cl.
*H01B 7/08* (2006.01)
*B60R 16/02* (2006.01)
(Continued)

(52) U.S. Cl.
CPC ....... *H01B 7/0823* (2013.01); *B60R 16/0215* (2013.01); *H01B 7/36* (2013.01); *H02G 3/0406* (2013.01)

(58) Field of Classification Search
None
See application file for complete search history.

(56) References Cited

U.S. PATENT DOCUMENTS 4,155,613 A * 5/1979 Brandeau .................. H01B 7/08
174/117 F
4,644,092 A * 2/1987 Gentry .................. H01R 12/594
174/102 C
(Continued)

FOREIGN PATENT DOCUMENTS

CN 202601279 12/2012
CN 206021968 3/2017
(Continued)

OTHER PUBLICATIONS

International Search Report issued in International Pat. Appl. No. PCT/JP2019/014123, dated Jun. 18, 2019, along with an English translation thereof.
(Continued)

*Primary Examiner* — Krystal Robinson
(74) *Attorney, Agent, or Firm* — Greenblum & Bernstein, P.L.C.

(57) ABSTRACT

A wiring member includes: a flat wiring body including a plurality of wire-like transmission members, and a base member that holds the plurality of wire-like transmission members to be flat; and a pattern provided on the flat wiring body, and making a three-dimensional posture of the flat wiring body recognizable.

10 Claims, 6 Drawing Sheets

(51) Int. Cl.
*H01B 7/36* (2006.01)
*H02G 3/04* (2006.01)

(56) References Cited

U.S. PATENT DOCUMENTS

| | | | | |
|---|---|---|---|---|
| 4,663,098 | A * | 5/1987 | Gilliam | H01B 7/0823 |
| | | | | 425/114 |
| 4,864,318 | A * | 9/1989 | Iwasaki | H01Q 1/38 |
| | | | | 343/905 |
| 5,008,489 | A * | 4/1991 | Weeks, Jr. | H01B 11/1008 |
| | | | | 428/209 |
| 6,437,248 | B1 | 8/2002 | Giebel | |
| 10,867,721 | B2 | 12/2020 | Ishida et al. | |
| 2002/0185299 | A1 | 12/2002 | Giebel | |
| 2014/0054085 | A1* | 2/2014 | Vermeulen | G02B 6/4416 |
| | | | | 174/124 R |

FOREIGN PATENT DOCUMENTS

| | | |
|---|---|---|
| JP | 2000-299019 | 10/2000 |
| JP | 2009-069866 | 4/2009 |
| JP | 2018-137208 | 8/2018 |
| WO | 2018/155166 | 8/2018 |

OTHER PUBLICATIONS

Office Action issued in Corresponding Chinese Patent Application No. 201980094629.8, dated Nov. 18, 2022, along with an English translation thereof.

Office Action issued in Corresponding CN Patent Application No. 201980094629.8, dated Sep. 22, 2023, along with an English translation thereof.

* cited by examiner

WIRING MEMBER

TECHNICAL FIELD

The present disclosure relates to a wiring member.

BACKGROUND ART

Patent Document 1 discloses a wire harness including a functional exterior member formed in a sheet shape, and an electrical wire disposed to overlap the functional exterior member in at least a partial region along a longitudinal direction, and at least a part of a portion in which an insulation covering of the electrical wire and the functional exterior member overlap is welded together.

PRIOR ART DOCUMENTS

Patent Documents

Patent Document 1: Japanese Patent Application Laid-Open No. 2018-137208

SUMMARY

Problem to be Solved by the Invention

By the way, there is a demand for automation in a work of assembling a wiring member such as the wire harness described in Patent Document 1 in a vehicle or the like. In automatically assembling the wiring member in the vehicle or the like, it is necessary to recognize a predetermined position in the wiring member, in some cases. However, the wiring member may be deviated from a predetermined shape due to movements in a container box or deflection due to its own weight during transportation.

Therefore, an object is to provide a technique capable of recognizing a predetermined position in a wiring member, even in a case where the shape of the wiring member deviates from a predetermined shape.

Means to Solve the Problem

A wiring member of the present disclosure is a wiring member including, a flat wiring body including a plurality of wire-like transmission members, and a base member that holds the plurality of wire-like transmission members to be flat; and a pattern provided on the flat wiring body, and making a three-dimensional posture of the flat wiring body recognizable.

Effects of the Invention

According to the present disclosure, even in a case where the shape of the wiring member deviates from a predetermined shape, a predetermined position in the wiring member becomes recognizable.

DESCRIPTION OF EMBODIMENT

Figure 1:
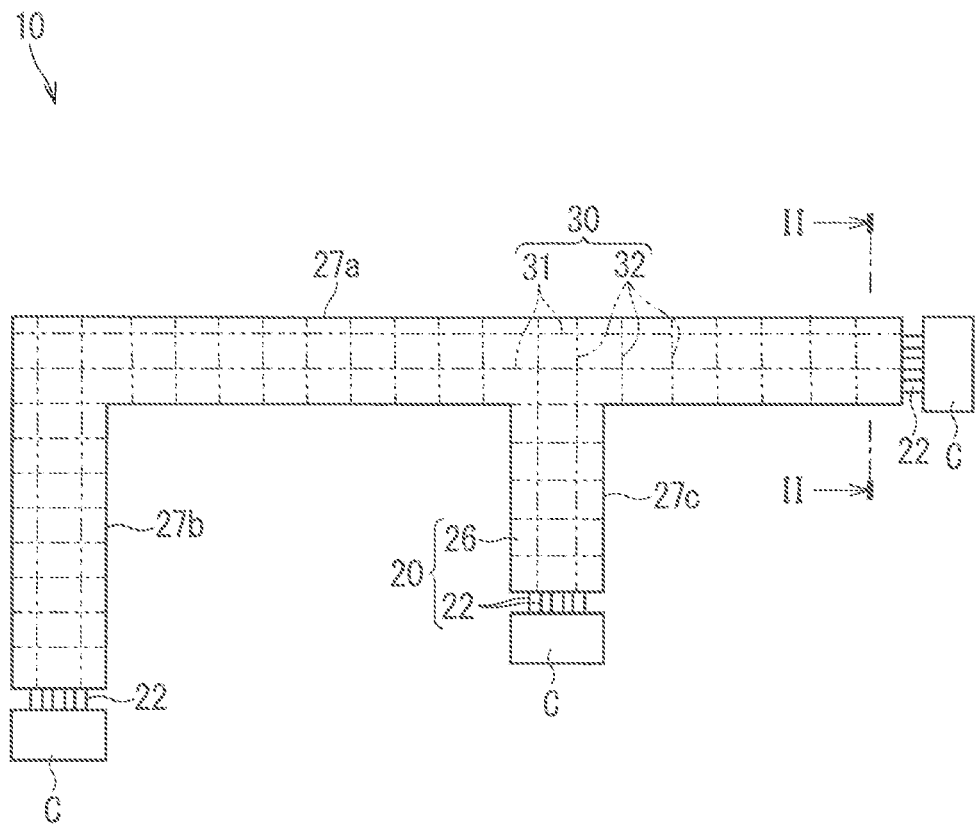
FIG. 1 is a plan view illustrating a wiring member according to a first embodiment.

Description of Embodiments of the Present Disclosure

First, embodiments of the present disclosure will be listed and described.

A wiring member in the present disclosure is as follows.

(1) A wiring member including: a flat wiring body including a plurality of wire-like transmission members, and a base member that holds the plurality of wire-like transmission members to be flat; and a pattern provided on the flat wiring body, and making a three-dimensional posture of the flat wiring body recognizable.

The recognition of the pattern provided on the flat wiring body generates an effect that the three-dimensional posture of the flat wiring body can be recognized. Even in a case where the shape of the wiring member deviates from the predetermined shape, the predetermined position in the wiring member becomes recognizable.

Here, the flat wiring body is a wiring body in which a dimension in a thickness direction is smaller than a dimension in a plane direction orthogonal to the thickness direction.

(2) The pattern is preferably a grid line. This is because a pattern can be easily provided.

(1) The grid line preferably includes the wire-like transmission member. This is because it is not necessary to separately provide a grid line for a part in which the wire-like transmission member is used as a grid line.

(4) The grid line preferably includes a part in which the wire-like transmission members intersect with each other. This is because the grid line can be configured only with the wire-like transmission members in the part in which the wire-like transmission members intersect with each other.

(5) The grid line preferably includes lines having different colors. This is because the rotation direction can be recognized.

(6) The pattern is preferably an aggregation of dots. This is because a pattern can be easily provided.

(7) it is considered that the pattern is provided only in a partial region of the base member. In this case, some patterns can be omitted.

(8) It is considered that the pattern is provided in an entire region of the base member. In this case, the entire flat wiring body is recognizable.

(9) It is preferable that a first pattern portion, and a second pattern portion finer than the first pattern portion are provided as the pattern. This is because the second pattern portion can be recognized in detail.

(10) The pattern is preferably applied onto the base member. This is because a pattern can be easily formed.

(11) The flat wiring body is preferably formed to have rigidity capable of suppressing an end portion from hanging down vertically when an intermediate portion is lifted up.

This is because the shape of the wiring member is less likely to deviate from the predetermined shape.

Details of Embodiments of the Present Disclosure

Specific examples of a wiring member in the present disclosure will be described below with reference to the drawings. Note that the present invention is not limited to these examples, but is indicated by the claims, and is intended to include meanings equivalent to the claims and all modifications within the scope.

First Embodiment

Figure 2:
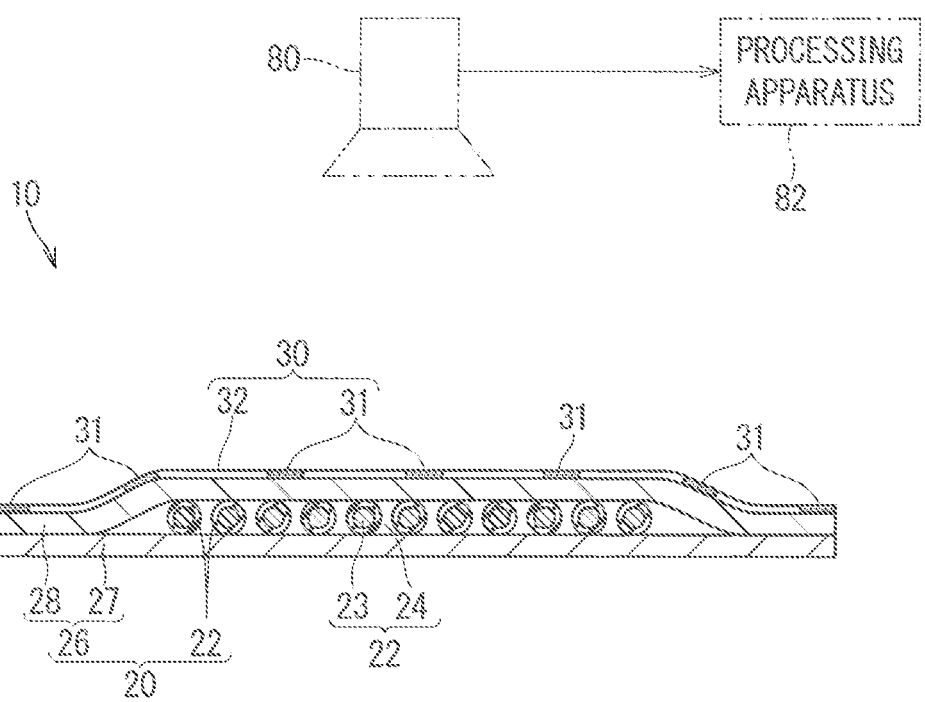
FIG. 2 is a cross-sectional view taken along line II-II of FIG. 1.

Hereinafter, a wiring member according to a first embodiment will be described. FIG. 1 is a plan view illustrating a wiring member 10 according to a first embodiment. FIG. 2 is a cross-sectional view taken along line II-II of FIG. 1. In FIG. 1, in order to distinguish between an outline of a base member 26 and a pattern 30, the outline of the base member 26 is indicated by a solid line, and the pattern 30 is indicated by a two-dot chain line.

The wiring member 10 includes a flat wiring body 20 and the pattern 30 provided on the flat wiring body 20.

The flat wiring body 20 is a member to be mounted on a vehicle, supplies the electric power to each piece of equipment of the vehicle, and exchanges signals. The flat wiring body 20 is a wiring body in which the dimension in a thickness direction is smaller than the dimension in a plane direction orthogonal to the thickness direction. The flat wiring body 20 includes a plurality of wire-like transmission members 22, and a base member 26 that holds the plurality of wire-like transmission members 22 to be flat.

The wire-like transmission members 22 may be any wire-like member that transmits electricity, light, or the like. For example, the wire-like transmission member 22 may be a common electrical wire having a core wire and a covering 24 around the core wire, or may be a shield wire, a twisted wire, an enameled wire, a nichrome wire, a bare electrical wire, an optical fiber, or the like.

The wire-like transmission members 22 that transmit electricity may be various signal lines or various power lines. The wire-like transmission members 22 that transmit electricity may be used as an antenna, a coil, or the like that transmits and receives signals or the electric power to and front space.

In the example illustrated in FIG. 2, the wire-like transmission member 22 includes a transmission wire body 23 that transmits electricity, light, or the like, and the covering 24 that covers the transmission wire body 23. In a case where the wire-like transmission member 22 is a common electrical wire, the transmission wire body 23 is a core wire, and the covering 24 is an insulation covering. In addition, in the example illustrated in FIG. 2, the plurality of wire-like transmission members 22 having the same diameters and structures are disposed in a single base member 26. However, the diameters, the structures, and the like of the plurality of wire-like transmission members 22 may be appropriately set, and the wire-like transmission members 22, which are different in diameter, structure, or the like, may be disposed in the same base member 26.

Further, the wire-like transmission member 22 may be a single wire-like object or a composite of a plurality of wire-like objects (a twisted wire, a cable in which a plurality of wire-like objects are aggregated and covered with a sheath, or the like). At ends of the wire-like transmission members 22, terminals, connectors C, or the like are appropriately provided in accordance with connection forms between the wire-like transmission members 22 and mating members.

The base member 26 keeps the plurality of wire-like transmission members 22 flat. The base member 26 is a member dial holds the wire-like transmission member 22 in a two-dimensionally positioned state. The base member 26 includes a sheet member 27 and a cover 28.

The wire-like transmission members 22 are disposed on a main surface that is one side of live sheet member 27. The sheet member 27 holds the plurality of wire-like transmission members 22 in an aligned state. The sheet member 27 may be a member, while being curved, having rigidity enough to hold planarly positioning the plurality of wire-like transmission members 22, or may be a member, while maintaining a flat state, having rigidity enough to hold two-dimensionally positioning the plurality of wire-like transmission members 22. The sheet member 27 may have a three-dimensional shape part such as a wall partially standing. Here, the sheet member 27 will be described as a bendable member.

The material constituting the sheet member 27 is not particularly limited, but the sheet member 27 is formed of a material containing a resin such as polyvinyl chloride (PVC), polyethylene terephthalate (PET), polypropylene (PP), or the like. The sheet member 27 may be a fiber material having fibers such as a nonwoven fabric, a woven fabric, or a knitted fabric, or may be a non-fiber material. As the non-fiber material, a solid sheet material in which the inside is uniformly embedded, a foamed body obtained by foam-molding a resin, or the like may be applicable. The sheet member 27 may include a material such as metal.

The sheet member 27 may be a single layer or a plurality of layers that are laminated. In a case where the plurality of layers are laminated, for example, it is conceivable that a resin layer and a resin layer are laminated. In addition, for example, it is conceivable that a resin layer and a metal layer are laminated. Further, the sheet member 27 may be formed by stacking a non-fiber material layer and a non-fiber material layer, may be formed by stacking a non-fiber material layer and a fiber material layer, or may be formed by stacking a fiber material layer and a fiber material layer.

The wire-like transmission members 22 are fixed to the sheet member 27 with disposed along a predetermined path on the main surface of the sheet member 27. The sheet member 27 is formed in a belt shape extending along the paths of the wire-like transmission members 22. The paths of the wire-like transmission members 22 on the sheet member 27 may be appropriately set, and the wire-like transmission members 22 may be linearly disposed or may be disposed to bend on the sheet member 27. In a case where the wire-like transmission members 22 are disposed to bend on the sheet member 27, the sheet member 27 may also be formed to bend. The plurality of wire-like transmission members 22 may be disposed in different paths so as to branch or intersect on the sheet member 27. In this case, the sheet member 27 may also be formed to branch or intersect. The sheet member 27 is formed in a shape along the paths of the plurality of wire-like transmission members 22, and thus enables suppression of interference between the sheet member 27 and other components, a reduction in weight, and die like. Here, the sheet member 27 is formed in a letter F shape, that is, a shape in which belt-shaped portions 27b and 27c respectively extend from ail end portion and an intermediate portion of the belt-shaped portion 27a.

The wire-like transmission member 22 and the sheet member 27 are fixed with each other. Such a fixing mode may include contact portion fixing or non-contact portion fixing, or both of them may be used in combination. Here, the contact portion fixing denotes that a part in which the wire-like transmission member 22 and the sheet member 27 are in contact with each other is fixed by adhering to each other. In addition, the non-contact portion fixing is a fixing mode in which the contact portion is not fixed. For example, a sewing thread, another sheet member 27, an adhesive tape, or the like presses the wire-like transmission members 22 toward the sheet member 27, or a sewing thread, another sheet member 27, an adhesive tape, or the like surrounds the wire-like transmission members 22 and the sheet member 27 to sandwich the wire-like transmission members 22 and the sheet member 27, so as to maintain the wire-like transmission members 22 and the sheet member 27 in a fixed state. In the following, a description will be given assuming that the wire-like transmission member 22 and the sheet member 27 are in a state of the contact portion fixing. Each description regarding the contact portion fixing is also applicable to the non-contact portion fixing, unless the configuration is inapplicable.

As a mode of the contact portion fixing, indirect fixing may be applicable, direct fixing may be applicable, or both may be used in different regions. Here, the indirect fixing denotes that the wire-like transmission member 22 and the sheet member 27 are indirectly adhered and fixed via an intervention member such as an adhesive agent, a sticky agent, a double-sided sticky tape, a surface fastener, or the like that is provided therebetween. In addition, the direct fixing denotes that the wire-like transmission member 22 and the sheet member 27 are directly adhered and fixed without art adhesive agent or the like that is provided separately. In the direct fixing, for example, it is conceivable that a resin contained in at least one of the wire-like transmission member 22 and the sheet member 27 is melted to be adhered and fixed. In the following, a description will be given assuming that the wire-like transmission member 22 and the sheet member 27 are in a state of the direct fixing. Each description related to the direct fixing is also applicable to the indirect fixing, unless the configuration is inapplicable.

For such a state of the direct fixing to be formed, for example, it is conceivable that a resin is melted by heat, or is melted by a solvent. That is to say, the state of the direct fixing may be a state of the direct fixing by heat or a state of the direct fixing by a solvent. The state of the direct fixing, by heat is preferable.

The means for forming the state of the direct fixing in this situation is not particularly limited, and various types of means including publicly known types of means such as welding, fusion, bonding, and the like can be used. For example, in a case of forming the state of the direct fixing by heat using welding, various types of welding means such as ultrasonic welding, heat and pressure welding, hot-air welding, and high-frequency welding can be adopted. Further, when the state of the direct fixing is formed by the above means, the wire-like transmission member 22 and the sheet member 27 are in the state of the direct fixing by such a means. Specifically, for example, in a case where the state of the direct fixing is formed by ultrasonic welding, the wire-like transmission member 22 and the sheet member 27 are in the state of the direct fixing by ultrasonic welding. A part in which the state of the direct fixing is formed by heat using the welding (a fixed part between the wire-like transmission member 22 and the sheet member 27) may be referred to as a welded portion, and in the welded portion, a fixed part by ultrasonic welding may be referred to as an ultrasonic welded portion, and a fixed part by heat and pressure welding may be referred to as a heat and pressure welded portion.

In the case of die direct fixing, only a resin contained in the covering 24 of the wire-like transmission member 22 may be melted, or only a resin contained in the sheet member 27 may be melted. In these cases, the melted resin of one of them adheres to the outer surface of the other, and a relatively clear interface may be formed. In addition, in the case of the direct fixing, both the resin contained in the covering 24 of the wire-like transmission member 22 and the resin contained in the sheet member 27 may be melted. In this case, both resins may be mixed together, and a clear interface may not be formed. In particular, in a case where the covering 24 of the wire-like transmission member 22 and the sheet member 27 contain resins that are easily melted together such as the same resin materials, both resins may be mixed together, and a clear interface may not be formed.

The cover 28 is fixed to the sheet member 27. The cover 28 covers the wire-like transmission member 22 from the opposite side of the sheet member 27. The cover 28 is not fixed to the wire-like transmission members 22 but may be fixed thereto.

The sheet member 27 and the cover 28 are fixed together at parts extending to the sides of the wire-like transmission members 22. As a fixing mode between the sheet member 27 and the cover 28, in the example illustrated in FIG. 2, the direct fixing without use of an intervention material such as an adhesive is illustrated. It is needless to say that the fixing mode between the sheet member 27 and the cover 28 is not limited to the direct fixing, and various types of fixing modes that have been described in the fixing mode between the sheet member 27 and the wire-like transmission member 22 can be used.

The same sheet-shaped members may be used for the sheet member 27 and the cover 28, or different sheet-shaped members may be used. Here, the different sheet-shaped members are used for the sheet member 27 and the cover 28. Here, the sheet-shaped member used for the sheet member 27 is more suitable to be fixed to the wire-like transmission member 22 than the sheet-shaped member used for the cover 28. The sheet-shaped member used for the cover 28 is higher in rigidity and shape maintaining property than those of the sheet-shaped member used for the sheet member 27. For example, the sheet member 27 is a member including a first layer, which is formed of the same material with the covering 24 of the wire-like transmission member 22 in a solid sheet shape, and to which the wire-like transmission member 22 is fixed, and a second layer, which is formed of a nonwoven fabric, and which overlaps the first layer. The cover 28 is a member formed of nylon or the like in a solid sheet shape.

The cover 28 is formed in a similar shape to the sheet member 27, and covers the entirety of the sheet member 27. It is needless to say that the cover 28 may be formed in a shape different from that of the sheet member 27, or may cover a part of the sheet member 27.

The flat wiring body 20 is desirably formed to have rigidity capable of suppressing end portions from hanging down vertically, when the intermediate portion is lifted up. Here, the flat wiring body 20 is formed such that the rigidity is imparted by the cover 28, and a predetermined shape is maintained as much as possible. For example, the shape of the flat wring body 20 is desirably maintained in a form to be disposed on a vehicle or a form similar to this. This configuration enables elimination of a work for wire routing the flat wiring body 20 at the time of assembling the wiring member 10 in the vehicle.

Figure 3:
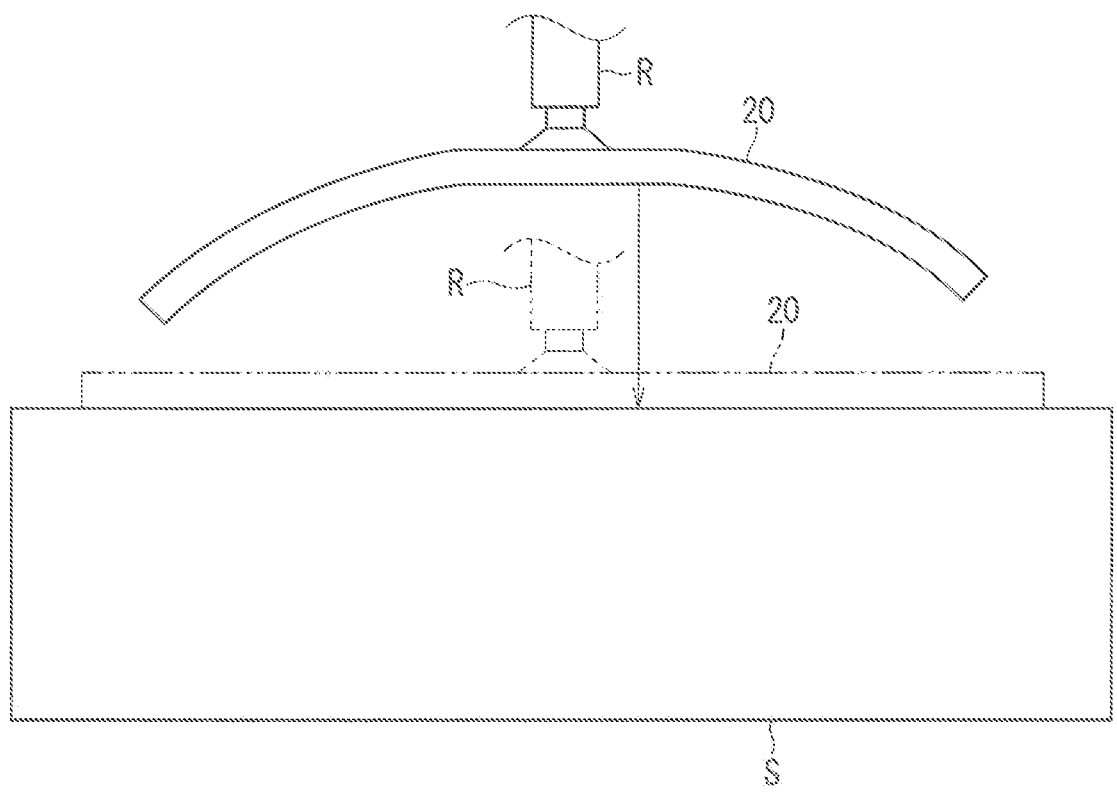
FIG. 3 is a view for describing a state in which an intermediate portion of the wiring member is lifted up.

As illustrated in FIG. 3, when the intermediate portion is lifted up by the robot R or the like, in other words, when an end portion is lifted up in a manner that extends in a cantilever shape, the flat wiring body 20 desirably has the rigidity such that the part in the cantilever shape does not hang down, or even if it hangs down, it hangs down like an arc shape. As illustrated in FIG. 3, the way of hanging down like an arc shape is that when a predetermined part of the flat wiring body 20 is lifted up and is in a hanging-down state is placed on a stage S wider than the flat wiring body 20, a hanging-down part does not bend inward on the stage S or another part does not overlap thereon, that is, the hanging-down part spreads outward on the stage S. This eliminates the need for correcting overlapping of the end portions, after the flat wiring body is carried by the robot R, and thus assembling workability can be improved.

Note that the flat wiring body 20 can be formed to be foldable for transportation or the like, in some cases. In a state where the flat wiring body 20 is folded, a bent portion becomes an end portion of the flat wiring body 20. That is, when the intermediate portion is lifted up in a folded state, the flat wiring body 20 is desirably formed to have the rigidity capable of suppressing the end portion (the bent portion) from hanging down vertically. In addition, in a state in which the flat wiring body 20 formed to be foldable is unfolded, when a part closer to the foldable portion in a part on the end portion side of the foldable portion is lifted up, the flat wiring body is desirably formed to have the rigidity capable of suppressing the end portion from hanging down vertically.

The pattern 30 is provided so that the three-dimensional posture of the flat wiring body 20 is recognizable. As the pattern 30, the pattern 30 the appearance of which changes when the flat wiring body 20 bends is provided. In particular, as the pattern 30, the pattern 30 the appearance of which changes when the flat wiring body 20 bends in a front-back direction is provided. The pattern 30 is provided in the entire region of the base member 26.

In the present example, the pattern 30 wall be described as grid lines 30. The grid lines 30 include first and second lines 31 and 32 that intersect each other. A plurality of first lines 31 are provided in a mode to extend in parallel with each other. A plurality of second lines 32 are also provided in a manner to extend in parallel with each other. Here, the first and second lines 31 and 32 are orthogonal to each other, but may intersect at an angle other than such an angle. In addition, here, the first lines 31 extend in the same direction as the direction in which the belt-shaped portion 27a extends, and the second lines 32 extend in the same direction as the directions in which the belt-shaped portions 27b and 27c extend. However, the directions in which the first lines 31 and the second lines 32 extend are not limited to this. The first and second lines 31 and 32 may extend in directions intersecting with the extending direction of the belt-shaped portions 27a, 27b, and 27c.

The colors of all the grid lines 30 may be the same. Further, the grid lines 30 may include lines having different colors. For example, the color of the first lines 31 and the color of the second lines 32 can be different from each other. In this case, the first and second lines 31 and 32 are easily recognized, and in a state where the wiring member 10 is located at a predetermined position, the direction of rotation in a plane direction (rotation about an axis extending along the thickness direction) is easily recognized. In addition, for example, the plurality of first lines 31 may include lines of different colors, and the plurality of second lines 32 may include lines of different colors.

The line width and the line space between the grid lines 30 are not particularly limited. For example, the line width and line space between the grid lines 30 may be any line width and any line space that can be recognized in a captured image, and are appropriately set in accordance with the resolution, scale, and the like of the captured image. In addition, the line widths and the line spaces may be the same in all the grid Sines 30, or some of the grid lines 30 may be different.

Here, the pattern 30 is applied to the base member 26. The pattern 30 may be formed by, for example, attaching a member having a color different from that of the base member 26 to the base member 26. In this case, a single-sided adhesive tape may be attached to the base member 26, a strip piece having no adhesive layer may be fusion-bonded to the base member 26, or may be attached to the base member 26 with an adhesive, a double-sided adhesive tape, or the like, or paint may be applied to the base member 26 by printing or the like. Furthermore, the pattern 30 may be formed by laser marking. In this case, when the base member 26 is irradiated with laser light, the surface of the base member 26 is melted or burnt, its color is then changed, and the pattern 30 is formed.

In a case where the base member 26 includes the sheet member 27 and the cover 28 as in the present example, the pattern 30 may be applied to the sheet member 27 or the cover 28. For example, in a case where the rigidity of the sheet member 27 and the rigidity of the cover 28 are different from each other, the pattern 30 is desirably applied to one having higher rigidity of the sheet member 27 and the cover 28. This is because the pattern 30 is less likely to collapse.

The pattern 30 is provided at least at an intermediate wiring portion between the connector C and the connector C in the flat wiring body 20. In the present example, the pattern 30 is provided to reach the vicinities of the positions of the connectors C. Specifically, the connectors C are each provided at a position immediately close to the wire-like transmission members 22 that extend from the base member 26 and the grid lines 30 are provided to edges of the base member 26. However, an edge portion of the connector C may be provided to overlap the base member 26, and the pattern 30 may be provided to the position of the connector C. In this manner, in a case where the pattern 30 is provided to reach the position car near the position of the connector C, the recognition of the pattern 30 enables the recognition of the position of the connector C with high accuracy. The position of the connector C becomes recognizable with high accuracy, and thus half-fitting of the connector C is detectable at the time of an assembling work.

<Method for Recognizing Wiring Member>

Next, a method for recognizing the wiring member 10 using the pattern 30 will be described. Here, a description will be given assuming that the wiring member 10 is recognized using the pattern 30, when the wiring member 10 is assembled in the vehicle. In particular, here, the description will be given assuming that the wiring member 10 is automatically recognized using the pattern 30, when the wiring member 10 is automatically assembled in the vehicle. The wiring member 10 may be deviated from a predetermined shape due to movements in a container box or deflection due to its own weight during transportation. The recognition of such deviation using the pattern 30 enables elimination of a work error with respect to a predetermined position in the wiring member 10.

First, an image of the wiring member 10 that has been transported to a predetermined work station is captured. For example, as illustrated in FIG. 2, an imaging apparatus 80 captures an image of the flat wiring body 20 from a normal direction (a thickness direction). The imaging apparatus 80 may include a monocular camera or a stereo camera. The pattern 30 is desirably recognizable by image recognition by the monocular camera from the normal direction. Consequently, the configuration of the imaging apparatus 80 can be simplified. In addition, the imaging apparatus 80 may capture a color image or may capture a monochrome image. In a case where the grid lines 30 having different colors are induced in the pattern 30, the imaging apparatus 80 desirably captures a color image. The image that has been captured by the imaging apparatus 80 is sent to a processing apparatus 82.

In the processing apparatus 82, a distortion in the flat wiring body 20 is acquired from the captured image. The processing apparatus 82 includes, for example, a computer including a microprocessor, a ROM, a RAM, and the like. An arithmetic processing unit such as a microprocessor performs a process of acquiring a distortion in the flat wiring body 20 from the state of the pattern 30 in the captured image. For example, a difference between the state of the pattern 30 in the captured image and the state of the pattern 30 in the wiring member 10 in the normal state that has been acquired beforehand is calculated, and the distortion in the flat wiring body 20 is acquired. The wiring member 10 in the normal state mentioned here is the wiring member 10 in a state in which the shape of the flat wiring body 20 is not deviated.

Figure 4:
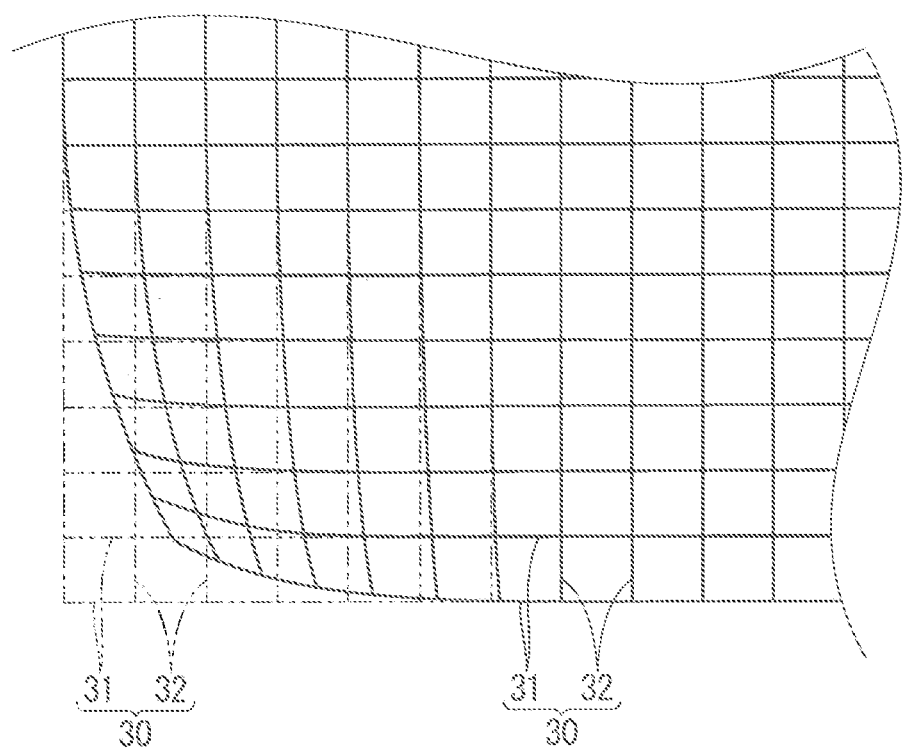
FIG. 4 is a view for describing how a posture of the wiring member is recognized using a pattern.

For example, consideration will be given to a case where a captured image as illustrated in FIG. 4 is acquired as a captured image, in FIG. 4, solid lines are the grid lines 30 that have been acquired in the captured image, and two-dot chain lines are the grid lines 30 in the wiring member 10 in the normal state. In the example illustrated in FIG. 4, the grid lines 30 in the wiring member 10 in the normal slate extend linearly. On the other hand, in the grid lines 30 that have been acquired in the captured image, there is a part in which the grid lines 30 bend and extend at a corner portion. In addition, there is a part in which the space between the grid lines 30 is also changed. From these changes in the grid lines 30, the distortion of the flat wiring body 20 (here, the degree of bending of the flat wiring body 20 in the front-back direction) can be acquired, and thus a three-dimensional posture of the flat wiring body 20 can be acquired.

Note that whether the bend of the flat wiring body 20 is a bend toward the front surface side or a bend toward the back surface side is recognizable by image capturing with a stereo camera, for example. In addition, it is recognizable with a monocular camera by using a distance measuring sensor.

When the three-dimensional posture of the flat wiring body 20 can be acquired, a predetermined position in the flat wiring body 20 can be held by the robot R or the like with high accuracy in a predetermined posture. In addition, when the pattern 30 is recognized after the work of fitting the connector C, and the three-dimensional posture of the flat wiring body 20 can be acquired, a fitting state of the connector C can also be determined. Specifically, when the pattern 30 is formed to reach the position or near the position of the connector C, the position, posture, and the like of the connector C can be estimated with high accuracy by recognizing the pattern 30, and thus the fitting state of the connector C can be determined.

Note that an arithmetic processing unit such as a microprocessor reads a computer program including a part or all of a process of acquiring a distortion in the flat wiring body 20 from the captured image from each storage unit such as a ROM or a RAM, and executes the computer program. The computer programs of such a plurality of apparatuses each can be installed from an external server apparatus or the like. In addition, the computer programs of the plurality of apparatuses are each distributed in a state of being stored in a recording medium such as a CD-ROM, a DVD-ROM, or a semiconductor memory.

According to the wiring member 10 as described above, the recognition of the pattern 30 provided on the flat wiring body 20 enables the generation of an action to be capable of recognizing the three-dimensional posture oi the flat wiring body 20. Even in a case where the shape of the wiring member 10 deviates from a predetermined shape, a predetermined position in the wiring member 10 becomes recognizable. The pattern 30 is provided in tire entire region of the base member 26, so the entirety of the flat wiring body 20 is recognizable, live pattern 30 is applied to the base member 26, and the pattern 30 can be easily formed.

The pattern 30 includes the grid lines 30, and the pattern 30 can be easily provided. The grid lines 30 include lines having different colors, so the rotation direction of the flat wiring body 20 can be recognized.

The flat wiring body 20 is formed to have the rigidity capable of suppressing the end portions from hanging down vertically when the intermediate portion is lifted up. Therefore, the shape of the wiring member 10 is less likely to deviate from the predetermined shape.

Second Embodiment

Figure 5:
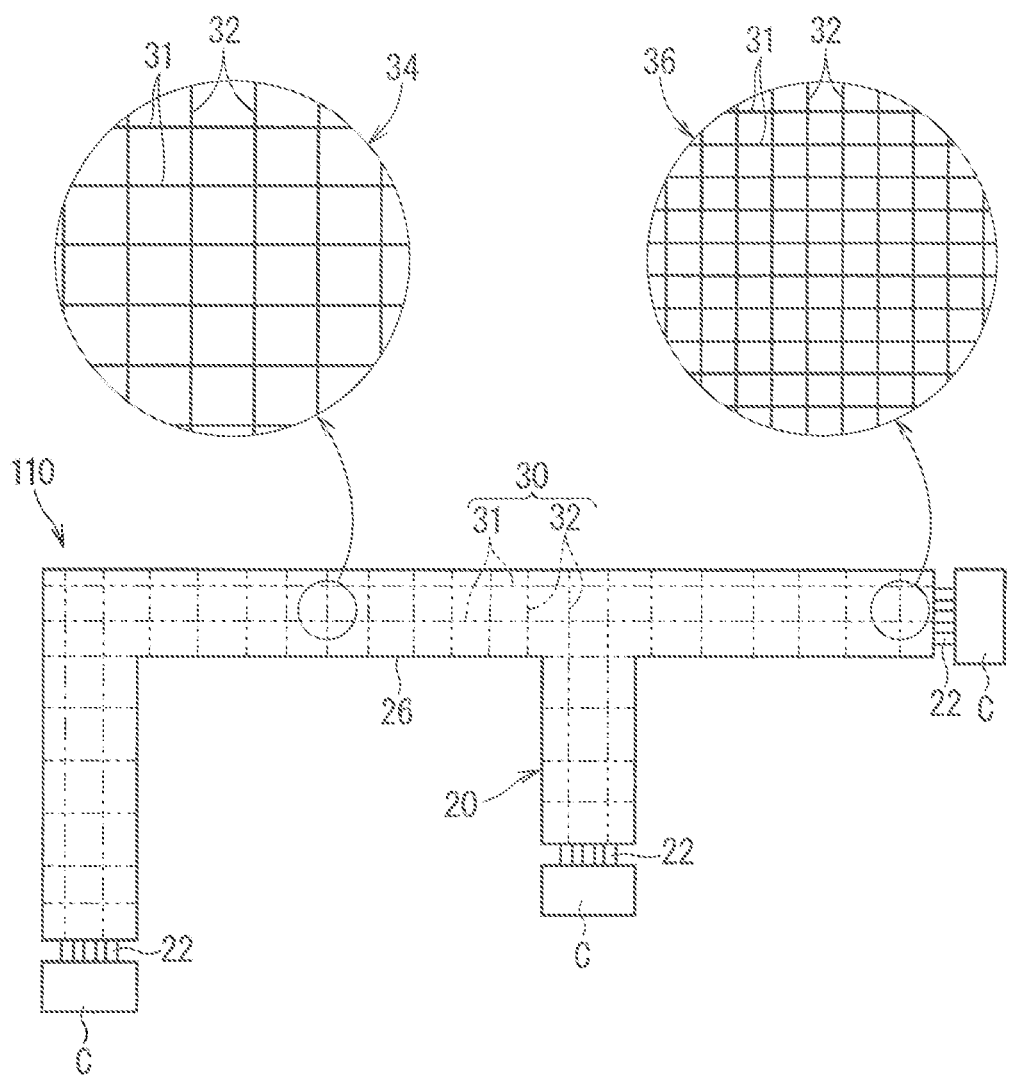
FIG. 5 is a plan view illustrating a wiring member according to a second embodiment.

A wiring member according to a second embodiment will be described. FIG. 5 is a plan view illustrating a wiring member 110 according to the second embodiment. In addition, FIG. 5 is an enlarged view of a part of the wiring member 110. Note that in the description of the present embodiment, the same components as those described above are denoted by the same reference numerals, and the descriptions will be omitted. The same reasoning applies to each embodiment in the following.

In the wiring member 110 in the present example, a first pattern portion 34 and a second pattern portion 36, which is finer than the first pattern portion 34, are provided as the pattern 30. Accordingly, the second pattern portion 36 can be recognized in detail. Here, the space between the grid lines 30 in the second pattern portion 36 is formed to be narrower than the space between the grid lines 30 in the first pattern portion 34.

For example, the first pattern portion 34 is formed in a part that does not have to be recognized in detail in the wiring member 110. Examples of the part that does not have to be recognized in detail in the wiring member 110 include an intermediate portion of a linearly extending part, a part that is not easily distorted such as a part having high rigidity, and the like. On the other hand, the second pattern portion 36 is formed in a part of the wiring member 110 desired to recognize in detail. Examples of the part desired to recognize in detail in the wiring member 110 include a branched wire portion, a branch portion, an end portion, and the like. In addition, examples of the part desired to recognize in detail include a part having high accuracy to be demanded at the time of assembling work.

Third Embodiment

Figure 6:
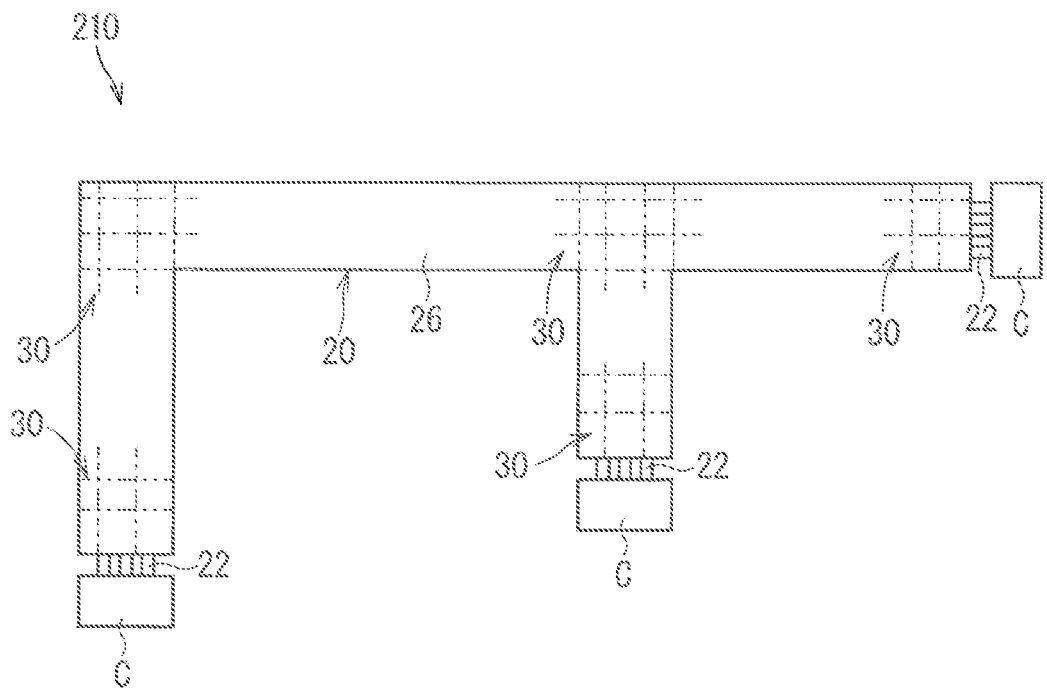
FIG. 6 is a plan view illustrating a wiring member according to a third embodiment.

A wiring member according to a third embodiment will be described. FIG. 6 is a plan view illustrating a wiring member 210 according to the third embodiment.

In the wiring member 210 in the present example, the pattern 30 is provided only in a partial region of the base member 26. In this case, some of the patterns 30 can be omitted. Examples of a part in which the pattern 30 can be omitted include a part that does not have to be recognized at the time of assembling work, a part in which the shape can be estimated with high accuracy by recognizing the part in which the pattern 30 is formed, and the like. In addition, for example, in the wiring member 110 according to the second embodiment, it is conceivable that the first pattern portion 34 is a pint omitted in the present example, and the second pattern portion 36 is a part provided with the pattern 30 in the present example.

Fourth Embodiment

Figure 7:
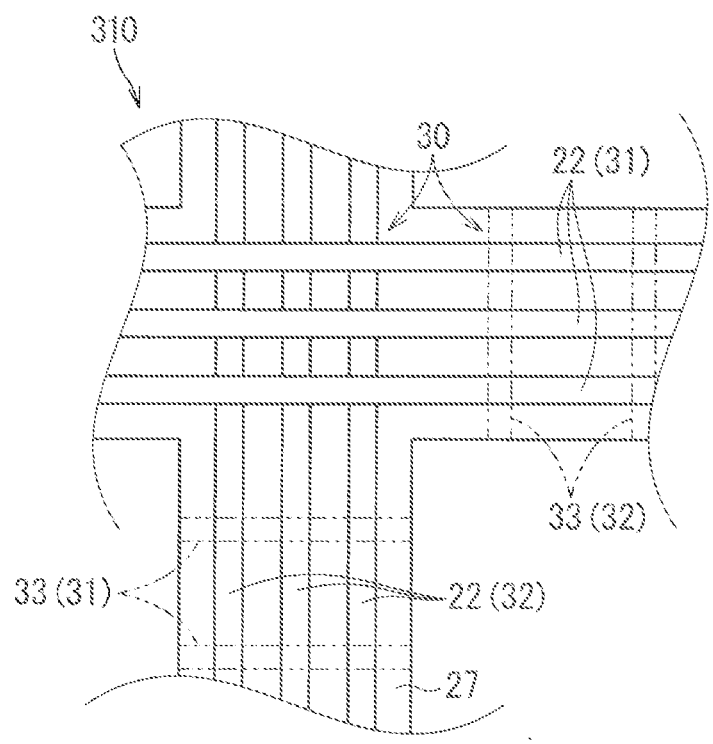
FIG. 7 is a plan view illustrating a wiring member according to a fourth embodiment.

A wiring member according to a fourth embodiment will be described. FIG. 7 is a plan view illustrating a wiring member 310 according to the fourth embodiment.

In the wiring member 310 in the present example, the grid lines 30 include the wire-like transmission members 22. That is, the wire-like transmission members 22 are used as the grid lines 30. This configuration eliminates the need for separately providing the grid lines 30 in a part in which the wire-like transmission members 22 are used as the grid lines 30. In the part in which the wire-like transmission members 22 are used as the grid lines 30, for example, the cover 28 is not provided and the wire-like transmission members 22 are exposed, or the cover 28 that is transparent is provided as the cover 28, so that the wire-like transmission members 22 are recognizable. For example, the wire-like transmission members 22 may be set to have a color different from that of the sheet member 27. Specifically, the wire-like transmission members 22 and the sheet member 27 may be set to a combination of colors that are high in contrast such as black and white.

In the wiring member 310 in the present example, the grid lines 30 include a part in which the wire-like transmission members 22 intersect with each other. Consequently, in the part in which the wire-like transmission members 22 intersect with each other, the grid lines 30 can be configured only with the wire-like transmission members 22. That is, the wire-like transmission members 22 that intersect with each other can be the first and second lines 31 and 32 in the grid lines 30. It is needless to say that one of the first and second lines 31 and 32 in the grid lines 30 may be the wire-like transmission members 22, and the other of the first and second lines 31 and 32 in the grid lines 30 may be lines 33 provided on the base member 26 separately from the wire-like transmission members 22. In this case, the lines 33 provided on the base member 26 separately from the wire-like transmission members 22 may be provided on the wire-like transmission members 22 so as to cross the wire-like transmission members 22.

[Supplementary Note]

Figure 8:
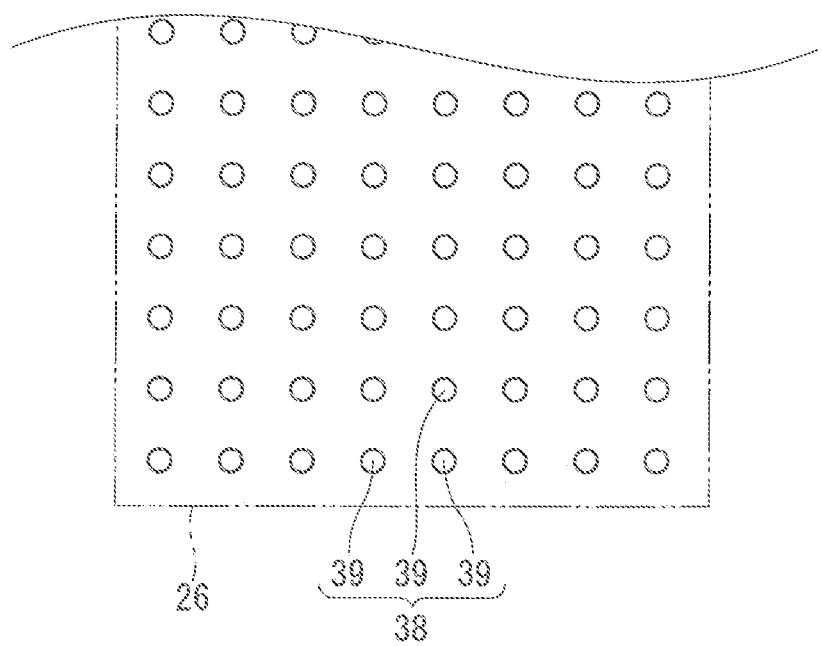
FIG. 8 is a view illustrating a modification of the pattern.

Heretofore, the description has been given that the pattern 30 serves as the grid lines 30, but this is not an essential configuration. The pattern 30 may be anything other than the grid lines 30. For example, as illustrated in FIG. 8, a pattern 38 may be an aggregation of dots 39 (dot-shaped portions). In this manner, also in a case where the pattern 38 is an aggregation 38 of the dots, the pattern 30 can be easily provided.

In addition, heretofore, the description has been given with regard to the flat wiring body 20, in which the wire-like transmission members 22 are fixed on the sheet member 27, but this is not an essential configuration. For example, the flat wiring body may be a so-called flexible flat cable or the like that holds a plurality of linear conductors sandwiched between two film materials.

Note that the configurations that have been described in the above embodiments and modifications each can be appropriately combined, as long as they do not contradict each other.

EXPLANATION OF REFERENCE SIGNS 10, 110, 210, 310: wiring member
20: flat wiring body
22: wire-like transmission member
23: transmission wire body
24: covering
26: base member
27: sheet member
27a, 27b, 27c: belt-shaped portion
28: cover
30: grid line (pattern)
31: first line
32: second line
33: line
34: first pattern portion
36: second pattern portion
38: aggregation of dots (pattern)
39: dot
80: imaging apparatus
82: processing apparatus
C: connector
R: robot
S: stage

The invention claimed is:

1. A wiring member comprising:
a flat wiring body including a plurality of wire-like transmission members, and a base member that holds the plurality of wire-like transmission members to be flat; and
a pattern provided on the flat wiring body, and making a three-dimensional posture of the flat wiring body recognizable,
wherein the pattern is a grid line, and
wherein the grid line includes the wire-like transmission member.

2. The wiring member according to claim 1, wherein the grid line includes a part in which the wire-like transmission members intersect with each other.

3. The wiring member according to claim 1, wherein the grid line includes lines each having different colors.

4. The wiring member according to claim 1, wherein the pattern is an aggregation of dots.

5. The wiring member according to claim 1, wherein the pattern is provided only in a partial region of the base member.

6. The wiring member according to claim 1, wherein the pattern is provided in an entire region of the base member.

7. The wiring member according to claim 1, wherein a first pattern portion, and a second pattern portion finer than the first pattern portion are provided as the pattern.

8. The wiring member according to claim 1, wherein the pattern is applied onto the base member.

9. The wiring member according to claim 1, wherein the flat wiring body is formed to have rigidity capable of suppressing an end portion from hanging down vertically, when an intermediate portion is lifted up.

10. A wiring member comprising:
- a flat wiring body including a plurality of wire-like transmission members, and a base member that holds the plurality of wire-like transmission members to be flat; and
- a pattern provided on the flat wiring body, and making a three-dimensional posture of the flat wiring body recognizable,
- wherein a first pattern portion, and a second pattern portion finer than the first pattern portion are provided as the pattern.

* * * * *